United States Patent Office 2,933,095
Patented Apr. 19, 1960

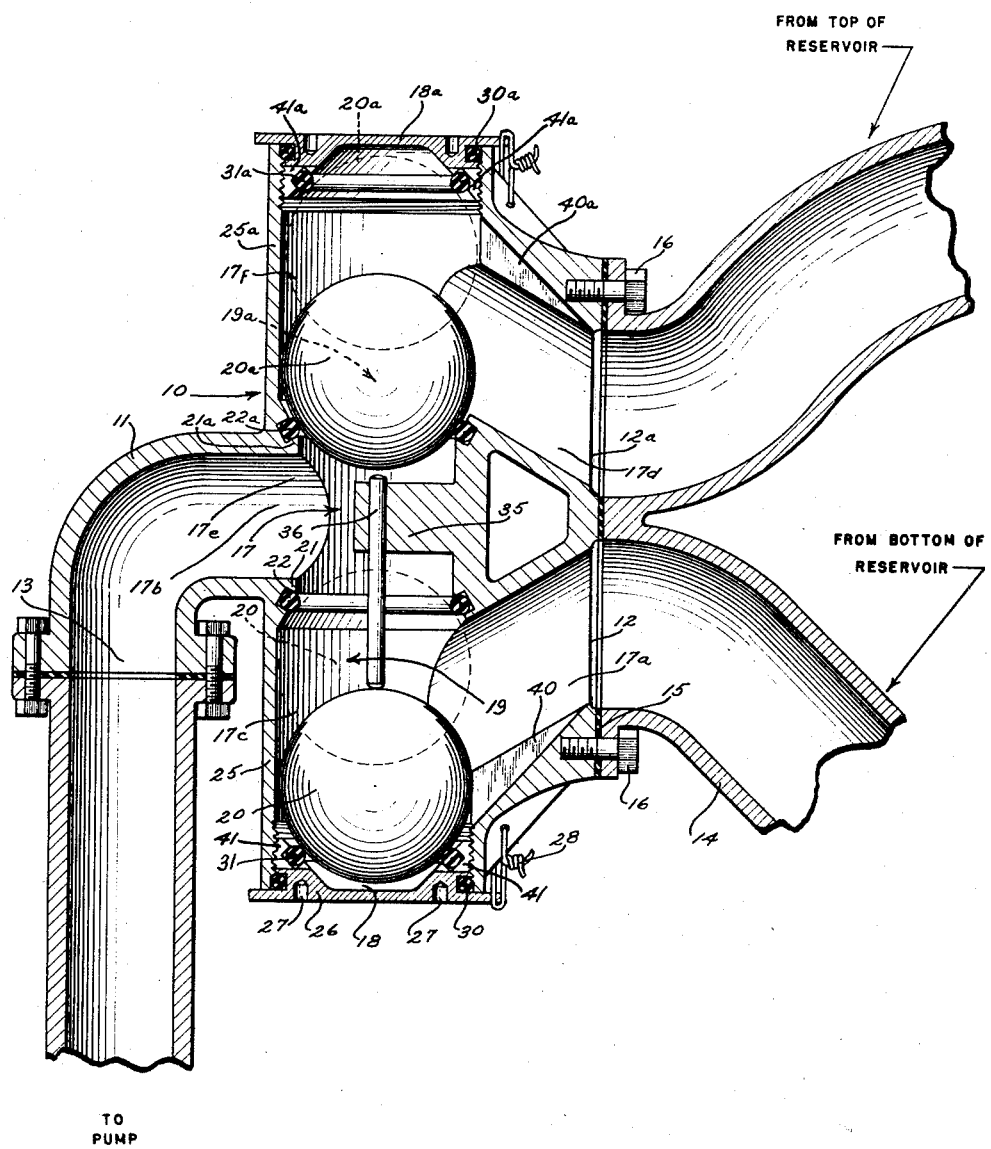

2,933,095

VALVE CONSTRUCTION

Rollin Douglas Rumsey, Buffalo, N.Y., assignor to Houdaille Industries, Inc., Buffalo, N.Y., a corporation of Michigan Application April 15, 1957, Serial No. 652,916

7 Claims. (Cl. 137—38)

This invention relates generally to a valve construction, and more specifically to a gravity actuated selected valve.

When liquid is withdrawn from a reservoir in an airplane, for example an oil reservoir, such liquid is withdrawn from the bottom or the top of such reservoir, depending upon whether the aircraft is experiencing positive or negative gravity. In high performance aircraft, it is common to pressurize the reservoir, so as to avoid cavitation. Thus, if the liquid in the reservoir is subjected to negative gravities, such as in aerobatic maneuvers, the point from which liquid is being withdrawn from the reservoir may be briefly exposed to the air above the liquid within the reservoir. Accordingly, when a selector valve is utilized to switch over between various points, it is essential that such selector valve permit no more than an absolute minimum of air to enter the oil pump during the actuation or changeover. It is also desirable that a selector valve employed for these purposes be so constructed that no more than one valve port or seat can be closed at a single time, since if all ports were closed, the pump withdrawing liquid from the reservoir would be unable to transfer liquid. Thus, if the liquid is the oil for the lubrication system of the engine, such a feature prevents the possibility that the valve could be the cause of engine lubrication failure. It is also desirable that the selector valve have high flow capacity for its size, and that it have a structure which permits extended operation without damage to various valve components.

I have provided a selector valve which has exceptionally high capacity for its size, and which employs resilient means to cushion the stoppage or arresting of the moving valve element to thereby lengthen the life. To obtain high capacity, I have provided a structure in which the movable element is withdrawn from the primary fluid path, whereby it does not serve or act as a restriction to flow.

Accordingly, it is an object of this invention to provide a simple actuator valve.

A further object of this invention is the provision of means whereby the components of the valve which are subjected to impact forces are cushioned against such forces, to thereby extend the life.

Yet another object of this invention is the provision of a valve structure which permits the removal of the movable valve actuating element from the fluid path, whereby such element does not cause a restriction to the flow of such fluid.

Yet another object is the provision of a double acting selector valve.

Many other advantages, features and additional objects of the present invention will become manifest to those versed in the art upon making reference to the details of description and the accompanying sheet of drawings in which a valve incorporating the principles of the present invention is shown by way of illustrative example.

On the drawing:

The figure is a cross-sectional view of a valve constructed in accordance with my invention.

As shown on the drawing:

The principles of this invention are particularly useful when embodied in an aircraft which has a reservoir from which liquid is to be withdrawn.

Referring to the figure, a selector valve constructed in accordance with the principles of my invention is generally indicated at 10. The valve includes a housing or casing 11 which has an internal passage 17 connecting its various elements. The housing has a port 12, for example an inlet port, which communicates with one branch 17a of the passage. The housing also has a second port 13 which communicates with a second branch 17b of the passage and which may be termed an outlet port. The ports 12 and 13 open to the exterior of the housing which is adapted adjacent to such openings for connection to the fluid system of which it is a part. Thus, the port 12 may be connected to a manifold 14, a tight connection therebetween being insured by gasket 15 and fastening means such as a plurality of screws 16. Thus, the manifold 14 may be connected to the bottom of a reservoir (not shown). The port 13 may be connected to another portion of the system, such as to a pump (not shown). The passage also includes a third branch 17c which is closed at its outer or distal end 18 and which communicates at its open or inner end with the other two branches at a more or less common point or zone 19. The third branch 17c comprises a guide means in which is carried a valve element, for example, a spherical valve 20. The branch 17b leading from port 13 has a seat 21 which is located intermediate the ports 12 and 13 and toward which the branch 17c is directed. In the form illustrated, the branch 17c extends in a direction which is perpendicular to the plane of the seat 21. The seat 21 preferably also includes a resilient O-ring 22 of circular cross-section against which the spherical valve 20 may sealingly engage. Such engagement occurs when the valve 10 is tilted from the position shown so that the spherical valve element 20 may roll or move along the third branch 17c and have its dynamic movement cushionably arrested by the O-ring 22. Thereafter, the O-ring acts as a static seal. Thus, the housing includes ports 12 and 13 which are interconnected, the housing having a seat intermediate such ports. It will be noted that the direction of movement of the valve 20 as it moves toward and away from the seat 21 is at an angle with respect to the branch leading to port 12. Thus, the casing 11 includes guide means 25 which directs the movement of the spherical valve 20. If the valve has been tilted gradually, the spherical element will roll along one wall of the guide means 25, while if it has been sharply inverted, or is otherwise subjected to a negative gravity, the ball may fall directly toward the opposite extreme of the path defined by guide means 25 and the seat 21.

I have found it to be particularly advantageous to so orient the port 12 with respect to the seat 21 that when the spherical element 20 is off the seat, it is positioned out of the path of the primary flow between the ports. Thus, when the spherical element 20 is moving away from seat 21, it also moves away from port 12, such movement continuing until it has moved an adequate distance out of the way.

The movement of the spherical element 20 contines in a direction away from the seat 21 until such movement is arrested by means provided at the distal end 18 of the third branch 17c of the internal passage. The means at 18 is illustrated here as including a cap 26 which is threadably received in the outer end of the guide means 25. Pin wrench holes 27 permit ready removal or insertion of the cap or plug 26 which may be locked in place as by safety wire 28. A seal between the cap 26 and the guide means 25 is provided by O-ring 30. The cap portion 26 of the guide means 25 also supports a resilient O-ring 31 interiorly of the housing and in the path of movement of the spherical valve 20. It is against O-ring 31 that the spherical element 20 rests when the valve is positioned as shown in the drawing. Thus, the O-ring 31 serves as a resilient means or bumper to arrest the motion of the valve in a downward direction, as illustrated. It is to be noted that the O-ring 31 has no sealing function.

Thus, when the valve is in an open position as shown, a flow of liquid may enter through port 12 and flow freely past one side of the spherical valve 20, through seat 21 and out through port 13. Of course, if desired, the flow may be in the opposite direction. However, it is preferable to consider port 12 as the inlet port so that reservoir pressures do not tend to unseat the spherical element 20 from the seat 21. Thus, it is apparent that the spherical element, when the valve is open, is adjacent to the flow passage between the ports. Since it has been guided into this offset position, the spherical element does not offer a restriction to flow whereby restriction to flow caused by the sperical element is precluded. In this position, the spherical element 20 is is remote from the common point and is also remote from the primary path taken by fluid flowing between the ports.

If the valve is installed as shown, and the valve is thereafter inverted, the spherical valve 20 will move from an open position to a sealing position against the O-ring 22. Thus, a particularly advantageous arrangement is obtained when one valve is installed as described and a second valve is similarly connected but with its outlet 12 directed to the top of the reservoir (not shown) and with its guide means 17c inverted from the position of the first valve.

For a further saving in weight, two such valves may be combined into a single housing and provided with a common outlet. Such a structure is shown in the drawing. The housing 11 thus includes a second inlet port 12a located at the end of a first branch 17d of an internal passage which joins with second and third branches 17e, 17f at a common point or region 19a. The second branch 17e terminates in outlet 13 and has a seat 21a in which is carried an O-ring 22a of circular cross-section.

The housing includes a guide means 25a which defines a third branch 17f in which is guidedly carried a spherical valve 20a. The guide means 25a includes an end cap 18a which is threadably received by the distal portion of the guide means 25a which is directed toward the seat 21a. The cap supports a resilient O-ring 31a which serves as a bumper or arresting means for the spherical element 20a. An O-ring 30a provides a seal between the cap 18a and the guiding portion 25a of the housing 11. Thus, it can be seen that the two halves of the valve are identical to each other, except that one has been reversed from the other with respect to the force of gravity considering such force as being directed perpendicularly to the plane of the seats 21 and 21a.

Thus, in operation, one valve moves toward its seat simultaneously with the other valve's moving away from its seat, and vice versa. If desired, a lug 35 may be disposed between seats 21 and 21a, which lug may slidably support a pin 36. This pin has a length exceeding the distance between the spherical valves if such valves were both engaging their respective seats. Thus, it is impossible for both valves to be closed at the same time. In the event that the upper valve 20a sticks in the position shown in solid lines, an inversion of the valve casing will cause the pin 36 to be actuated by valve 20 to thereby knock valve 20a loose from such sticking.

When the spherical valve 20 acts against the O-ring stop 31, the O-ring yields slightly and some of the fluid between the cap 26 and the spherical valve 20 is displaced. This displacement would tend to form a suction force or retaining force acting on the valve 20, which force would hold the valve 20 in an open position. Accordingly, a pair of slots or vents 41 and 41a have been provided in the caps 26 and 18a respectively. The vents 41 and 41a extend for such distance as to allow fluid to pass about the O-rings 31 and 31a respectively, thereby precluding possible sticking of the valves 20 and 20a in their respective open positions.

Preferably, the spherical valves 20 and 20a have only a small clearance with the guide means 25 and 25a respectively. Movement of either valve in an opening or closing direction would tend to be opposed by a piston-type or dash-pot type of resistive force. Accordingly, an additional pair of slot-type vents 40 and 40a has been provided in the housing 11 to serve as a flow passage through which fluid displaced by valves 20 and 20a respectively from the guide means 25 and 25a may pass, upon opening of the valves, and through which fluid may flow in the opposite direction upon closing of the respective valves. Thus the vents 40 and 40a reduce fluid damping and thereby improve the time response of the device.

Accordingly, a novel selector valve has been provided, which valve has unusually high flow capacity for its overall size and weight, and which has a structure which is capable of extended use without damage occurring to the parts which may impactingly engage each other.

Although various modifications may be suggested by those versed in the art, it should be understood that I wish to embody within the scope of the patent warranted hereon all such embodiments as reasonably and properly come within the scope of my contribution to the art.

I claim as my invention:

1. A selector valve comprising, in combination, a valve casing having an inlet port and an outlet port; said inlet port being adapted to be connected to a fluid reservoir; a valve seat disposed in said housing between said ports; a spherical valve disposed between said inlet port and said seat; guiding means, angularly disposed with respect to said inlet port, for said spherical valve on which said valve will roll and move in a line perpendicular to the plane of the seat when said valve casing is tilted, said guiding means being constructed so as to permit free flow of liquid from the inlet port past the spherical valve when in open position; and a resilient O-ring carried by said casing at the distal portion of said guiding means for stopping the movement of the spherical valve so as to provide a free passage for liquid from the inlet port past the spherical valve and through the open seat to the outlet port.

2. A selector valve comprising, in combination, a valve casing having an inlet port and an outlet port; said inlet port being adapted to be connected to a fluid reservoir; a valve seat disposed in said housing between said ports; a spherical valve disposed between said inlet port and said seat; guiding means for said spherical valve on which it will roll and move with respect to said seat when said valve casing is tilted, said guiding means being constructed so as to permit the valve to close said seat when the casing is in one position, and to permit the valve to move simultaneously away from both the seat and the inlet port when the casing is in another position; and a resilient O-ring for cushionably stopping the movement of the spherical valve in an unseated position at which position restriction to flow by said spherical valve is precluded, thereby providing a free passage for liquid from the inlet port past one side of the spherical valve and through the open seat to the outlet port.

3. A selector valve comprising, in combination, a valve casing having an internal passage comprising three branches joined together at a substantially common point, the first of said branches comprising a port, the second of said branches having a seat adjacent to said common point and comprising a port, and the third of said branches comprising a guide means, being closed at its outer end, and directed at its open end toward said seat; a spherical valve guidably disposed within said third branch; a resilient O-ring internally carried by the closed outer end of said third branch, and engageable by said spherical valve; said third branch guiding said spherical valve for rolling and moving into and out of closing engagement with said seat when said casing is tilted, and having such a length as to permit said spherical valve to lie in an unseated position against said resilient means and remote from said common point whereby the spherical valve is positioned remotely from fluid flowing between said ports.

4. A valve for controlling the point from which liquid is to be pumped from a reservoir comprising in combination: a valve casing having a pair of inlet ports arranged adjacent to each other along one side thereof and an outlet port intermediate the inlet ports along another side thereof, said inlet ports being adapted to be connected to the reservoir at the top and bottom thereof respectively; a valve seat disposed between each inlet port and the outlet port; an O-ring having a circular cross-section received in each of said seats; a spherical valve disposed between each O-ring and each inlet port, said valve being engageable with said O-ring as a cushion for dynamic engagement and as a seal for static engagement; guiding means for each spherical valve, angularly disposed with respect to said inlet port, on which the spherical valve will roll and move in a line perpendicular to the plane of said seat when said valve casing is tilted, each of said guiding means being arranged to permit closing of only one seat at a time and being constructed so as to permit the valve to close said seat when the casing is in one position, and to permit the valve to move simultaneously away from both the seat and the inlet port when the casing is in another position, thereby permitting free flow of liquid from the respective inlet port past the spherical valve when in open position; and a resilient O-ring carried by the casing at the distal portion of each of said guiding means for stopping the movement of each spherical valve toward its inlet port so as to provide alternative free passages for liquid from one inlet port, past the spherical valve, and through the open seat to the outlet port.

5. A fluid valve comprising, in combination: a casing having an inlet port and an outlet port, said ports being interconnected by a fluid path; a seat intermediate said ports; a valve element reciprocably guided within said casing for movement toward and away from said seat, said element being sealingly engageable with said seat to close said valve; and a resilient O-ring carried by said casing remotely from said path, said element being cushionably engageable with said O-ring upon opening movement, and being supported thereon during normal fluid flow through said valve.

6. A valve comprising, in combination: a casing having an inlet port and an outlet port, said ports being interconnected; a seat intermediate said ports; guide means having an open end, directed toward said seat, and a closed end; a valve element reciprocably guided within said guide means for movement alternatively toward and away from said seat and said closed end, said element being sealingly engageable with said seat to close said valve; a resilient O-ring carried adjacent to said closed end, said valve element being cushionably engageable with said O-ring in its open position; and an internal vent in said closed end, said vent extending from said closed end and about said O-ring to preclude sealing thereby.

7. A valve for fluid comprising, in combination: a casing having an inlet port and an outlet port, said ports being interconnected; a seat intermediate said ports; guide means having an open end, directed toward said seat, and a closed end; a valve element closely and reciprocably guided by said guide means for movement only toward and away from said seat, said element being both responsive to gravity and sealingly engageable with said seat to effect closing of said valve; and an internal vent communicating the closed end of said guide means at a point where said valve element is receivable with said inlet port, said valve element being movable directly adjacent to said vent and operable to reduce the effective size of said vent as said valve element approaches said closed end, whereby said valve element may initially be moved freely within said guide means without appreciable fluid resistance, and thereafter be progressively decelerated in its movement toward said closed end prior to engagement with said closed end by an increase in fluid resistance.

References Cited in the file of this patent

UNITED STATES PATENTS

| 755,922 | Osborn | Mar. 29, 1904 |
| 1,026,104 | Moorhead | May 14, 1912 |
| 1,943,805 | Barrie | Jan. 16, 1934 |
| 2,015,055 | Adams | Sept. 24, 1935 |
| 2,086,969 | Strelow | July 13, 1937 |
| 2,324,464 | Parker | July 20, 1943 |
| 2,332,007 | Parker | Oct. 19, 1943 |
| 2,389,168 | Snyder | Nov. 20, 1945 |
| 2,409,220 | Melichar et al. | Oct. 15, 1946 |
| 2,616,512 | Coon | Nov. 4, 1952 |

FOREIGN PATENTS

| 103,612 | Sweden | Jan. 27, 1942 |